United States Patent
Zhu

(10) Patent No.: US 11,620,609 B2
(45) Date of Patent: Apr. 4, 2023

(54) DELIVERY METHOD, DEVICE, SYSTEM, UNMANNED VEHICLE AND COMPUTER READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Jianghua Zhu, Beijing (CN)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 561 days.

(21) Appl. No.: 16/610,295

(22) PCT Filed: Apr. 25, 2018

(86) PCT No.: PCT/CN2018/084452
§ 371 (c)(1),
(2) Date: Nov. 1, 2019

(87) PCT Pub. No.: WO2018/210110
PCT Pub. Date: Nov. 22, 2018

(65) Prior Publication Data
US 2020/0082333 A1   Mar. 12, 2020

(30) Foreign Application Priority Data
May 18, 2017   (CN) .......................... 201710350086.4

(51) Int. Cl.
G06F 21/31   (2013.01)
G06Q 10/0833   (2023.01)
(Continued)

(52) U.S. Cl.
CPC ......... *G06Q 10/0833* (2013.01); *G06F 21/31* (2013.01); *G06F 21/34* (2013.01);
(Continued)

(58) Field of Classification Search
CPC ....... G06F 21/31; G06F 21/34; H04L 9/0863; H04L 9/3228; H04L 2209/84
See application file for complete search history.

(56) References Cited

U.S. PATENT DOCUMENTS

2003/0105964 A1* 6/2003 Brainard .............. G06Q 20/385
713/178
2004/0250068 A1* 12/2004 Fujisawa .............. G06Q 20/322
713/168
(Continued)

FOREIGN PATENT DOCUMENTS

CN   103927640 A   7/2014
CN   104129562 A   11/2014
(Continued)

OTHER PUBLICATIONS

Combined Chinese Office Action and Search Report dated Jul. 20, 2020 in Chinese Patent Application No. 201710350086.4 (with English translation of Category of Cited Documents), citing documents AO, AP and AX therein, 16 pages.
(Continued)

*Primary Examiner* — David J Pearson
(74) *Attorney, Agent, or Firm* — Oblon, McClelland, Maier & Neustadt, L.L.P.

(57) ABSTRACT

A delivery method, device, system, unmanned vehicle, and computer-readable storage medium, relating to the field of logistics technology. The delivery method includes monitoring a state of the unmanned vehicle; verifying a verification code input by the user and received from the unmanned vehicle in response to the unmanned vehicle
(Continued)

being not in an abnormal working state, and transmitting an unpacking instruction to the unmanned vehicle in response to successful verification.

19 Claims, 5 Drawing Sheets

(51) Int. Cl.
*G06F 21/60* (2013.01)
*H04L 9/32* (2006.01)
*H04L 9/08* (2006.01)
*G06F 21/34* (2013.01)

(52) U.S. Cl.
CPC .......... *G06F 21/602* (2013.01); *H04L 9/0863* (2013.01); *H04L 9/3228* (2013.01); *G06Q 2220/00* (2013.01); *H04L 2209/84* (2013.01)

(56) References Cited

U.S. PATENT DOCUMENTS

| | | | | |
|---|---|---|---|---|
| 2005/0060560 | A1* | 3/2005 | Sibert | G06F 21/64 713/193 |
| 2015/0006005 | A1* | 1/2015 | Yu | G06Q 50/28 701/22 |
| 2016/0068264 | A1* | 3/2016 | Ganesh | G06Q 10/083 701/4 |
| 2016/0094991 | A1* | 3/2016 | Powell | H04W 12/06 455/411 |
| 2017/0228690 | A1* | 8/2017 | Kohli | G06Q 20/10 |
| 2017/0320569 | A1* | 11/2017 | Gordon | G05D 1/106 |
| 2018/0146369 | A1* | 5/2018 | Kennedy, Jr. | H04W 12/04 |

FOREIGN PATENT DOCUMENTS

| | | |
|---|---|---|
| CN | 104680914 A | 6/2015 |
| CN | 105518728 A | 4/2016 |
| CN | 105892386 A | 8/2016 |
| CN | 105897918 A | 8/2016 |
| CN | 205563268 U | 9/2016 |
| CN | 106605252 A | 4/2017 |
| CN | 106682862 A | 5/2017 |

OTHER PUBLICATIONS

Qianye, Z., "Research on Scheduling Mechanism of Unmanned Device in Logistics", University of Electronic Science and Technology of China, Mar. 15, 2016, 1-65 with cover pages (with English abstract).

International Search Report dated Jun. 19, 2018 in PCT/CN2018/084452, citing documents AM-AO therein, 12 pages (with English translation).

Combined Office Action and Search Report dated Mar. 25, 2019 in Chinese Patent Application No. 201710350086.4, citing documents AM-AS therein, 11 pages (with English translation of categories of cited documents).

Office Action dated Nov. 1, 2019 in Chinese Patent Application No. 201710350086.4.

* cited by examiner

DELIVERY METHOD, DEVICE, SYSTEM, UNMANNED VEHICLE AND COMPUTER READABLE STORAGE MEDIUM

CROSS-REFERENCE TO RELATED APPLICATIONS

This application is based on the application with a CN application number of 201710350086.4 and the filing date being on May 18, 2017, and claims its priority. The disclosure of this CN application as a whole is incorporated into the present application herein by reference.

TECHNICAL FIELD

The present disclosure relates to the technical field of logistics technology, and in particular, to a delivery method, device, unmanned vehicle, and computer-readable storage medium.

BACKGROUND

In the related art, a user can realize self-service pick-up by clicking a short link. For example, when goods in an order are transferred into a self-service pick-up box, the server sends a short link to the user's cell phone. The user sends a pick-up request to the server by clicking on the short link. After verifying the parameters contained in the short link, the server opens the corresponding pick-up box and the user can take the goods away.

According to a first aspect of some embodiments of the present disclosure, there is provided a delivery method comprising: monitoring a state of an unmanned vehicle; receiving a verification code, which is input into the unmanned vehicle by a user and transmitted from the unmanned vehicle; performing verification to the verification code in response to the unmanned vehicle being in a normal working state; transmitting an unpacking instruction to the unmanned vehicle in response to successful verification.

In some embodiments, the verification code is input by the user via a verification code input interface on the unmanned vehicle.

In some embodiments, the verification comprises: a first check for determining whether or not the verification code input by the user is consistent with a pre-generated order verification code, wherein, the order verification code is generated by encrypting the intermediate data for a preset number of times; a second check for determining whether a result of decrypting the verification code input by the user for the preset number of times is consistent with intermediate data.

In some embodiments, the intermediate data comprises a primitive code, and encrypted data is obtained by symmetrically encrypting the primitive code; the second check comprises: performing substitutive decryption on the verification code input by the user to obtain first decrypted data; symmetrically decrypting the first decrypted data to obtain second decrypted data in the case where the first decrypted data is consistent with the encrypted data; determining that the verification code input by the user passes the second check in the case where the second decrypted data is consistent with the primitive code.

In some embodiments, the order verification code is generated by: selecting a preset number of characters to generate a primitive code, wherein the characters comprise one or more of letters, numbers or graphic symbols; generating encrypted data according to a result of symmetrically encrypting the primitive code; performing substitutive encryption on the encrypted data to generate an order verification code corresponding to an order to be delivered by the unmanned vehicle.

In some embodiments, the order verification code is re-generated for the order to be delivered by the unmanned vehicle in the case where the generated order verification code is the same with another order verification code of the unmanned vehicle.

In some embodiments, the method further comprises: storing a corresponding relation among unmanned vehicle information, order information, the primitive code, the encrypted data and the order verification code; deleting the corresponding relation in the case where a storage duration of the corresponding relation exceeds a preset duration.

In some embodiments, a pre-generated order verification code is transmitted to a user corresponding to an order to be delivered by the unmanned vehicle in response to a distance between the unmanned vehicle and a destination corresponding to the order to be delivered by the unmanned vehicle meeting a preset condition.

According to a second aspect of some embodiments of the present disclosure, there is provided a delivery device, comprising: a monitor configured to monitor a state of an unmanned vehicle; a receiver configured to receive a verification code, which is input into the unmanned vehicle by a user and transmitted from the unmanned vehicle; a controller configured to perform verification to the verification code in response to the unmanned vehicle being in a normal working state; and a transmitter configured to transmit an unpacking instruction to the unmanned vehicle in response to successful verification.

In some embodiments, the verification code is input by the user via a verification code input interface on the unmanned vehicle.

In some embodiments, the verification comprises: a first check for determining whether or not the verification code input by the user is consistent with a pre-generated order verification code, wherein, the order verification code is generated by encrypting the intermediate data for a preset number of times; a second check for determining whether a result of decrypting the verification code input by the user for the preset number of times is consistent with intermediate data.

In some embodiments, the intermediate data comprises a primitive code, and encrypted data is obtained by symmetrically encrypting the primitive code; the controller comprises a decoder configured to: perform substitutive decryption on the verification code input by the user to obtain first decrypted data; and symmetrically decrypt the first decrypted data to obtain second decrypted data; the second check comprises: obtaining first decrypted data from the decoder; obtaining second decrypted data from the decoder in the case where the first decrypted data is consistent with the encrypted data; determining that the verification code input by the user passes the second check in the case where the second decrypted data is consistent with the primitive code.

In some embodiments, the device further comprises an encoder configured to generate the order verification code by: selecting a preset number of characters to generate a primitive code, wherein the characters comprise one or more of letters, numbers or graphic symbols; generating encrypted data according to a result of symmetrically encrypting the primitive code; performing substitutive encryption on the encrypted data to generate an order verification code corresponding to an order to be delivered by the unmanned vehicle.

In some embodiments, the controller is further configured to re-generate the order verification code for the order to be delivered by the unmanned vehicle in the case where the generated order verification code is the same with another order verification code of the unmanned vehicle.

In some embodiments, the device further comprises: a memory configured to store a corresponding relation among unmanned vehicle information, order information, the primitive code, the encrypted data and the order verification code, wherein the corresponding relation is deleted in the case where a storage duration of the corresponding relation exceeds a preset duration.

In some embodiments, the transmitter is further configured to transmit a pre-generated order verification code to a user corresponding to an order to be delivered by the unmanned vehicle in response to a distance between the unmanned vehicle and a destination corresponding to the order to be delivered by the unmanned vehicle meeting a preset condition.

According to a third aspect of some embodiments of the present disclosure, there is provided an unmanned vehicle, comprising: an input interface configured to receive a verification code input by a user; a transmitter configured to transmit a current state to a delivery device and transmit the verification code input by the user to the delivery device, so that the delivery device performs verification to the verification code in response to the unmanned vehicle being in a normal working state; a receiver configured to receive an unpacking instruction transmitting from the delivery device in response to successful verification.

In some embodiments, the transmitter is further configured to report a current position to the delivery device, so that the delivery device transmits a pre-generated order verification code to a user corresponding to an order to be delivered by the unmanned vehicle in response to a distance between the unmanned vehicle and a destination corresponding to the order to be delivered by the unmanned vehicle meeting a preset condition.

According to a fourth aspect of some embodiments of the present disclosure, there is provided a delivery device, comprising: a memory; and a processor coupled to the memory, the processor configured to perform any one of the foregoing delivery methods based on instructions stored in the memory.

According to a fifth aspect of some embodiments of the present disclosure, there is provided a non-transitory computer-readable storage medium having stored thereon a computer program, wherein the program, when executed by a processor, implements any one of the foregoing delivery methods.

Other features and advantages of the present disclosure will become clear through detailed descriptions of the illustrative embodiments of the present disclosure with reference to the following accompanying drawings.

BRIEF DESCRIPTION OF THE DRAWINGS

In order to more clearly illustrate the embodiments or technical solutions in existing technologies of the present disclosure, a brief introduction will be given below for the drawings required to be used in the description of the embodiments or technical solutions in existing technologies. It is obvious that, the drawings illustrated as follows are merely some of the embodiments of the present disclosure. For an ordinary skilled person in the art, he or she may also acquire other drawings according to such drawings without paying inventive efforts.

DETAILED DESCRIPTION

Figure 1:
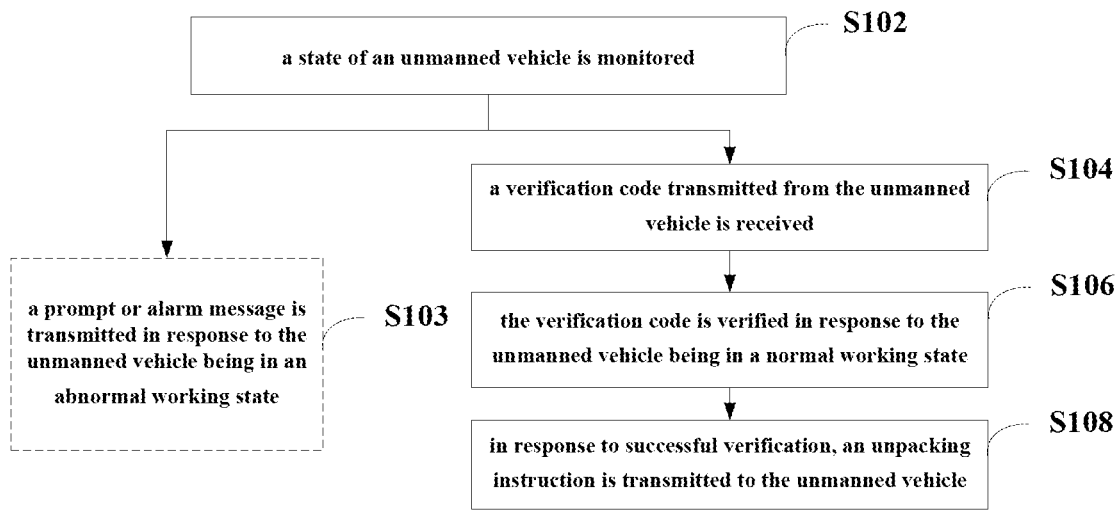
FIG. 1 is an exemplary flow diagram of a delivery method according to some embodiments of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure instead of all of them. The following descriptions on at least one illustrative embodiment are actually illustrative, but shall not set any limitation on the present disclosure and its application or utilization. All other embodiments that are obtainable to those skilled in the art based on the embodiments of the present disclosure without any creative effort are included in the protection scope of the present disclosure.

Unless otherwise illustrated, respective arrangements, mathematic expressions and values of the components and steps illustrated in these embodiments do not limit the scope of the present disclosure.

Meanwhile, it shall be understood that in order to facilitate description, the respective parts shown in the drawings are not drawn in sizes according to actual proportional relations.

Techniques, methods and devices that have already been known to ordinary technicians in the art may not be discussed here in detail, but under suitable circumstances, the techniques, methods and devices shall be deemed as parts of the granted description.

In the embodiments shown and discussed here, any specific value shall be interpreted as only illustrative, instead of limitative Hence, other embodiments of the illustrative embodiments may have different values.

It shall be noted that similar marks and letters represent similar items in the following figures. So once a certain item is defined in one figure, no further discussion on it is required in the following figures.

The inventor of the present disclosure has found that: the existing pick-up method is less secure and will result in a loss of the benefits of the real user of the order. This is because the thief would forge a short link and send a request to the server through a pseudo base station or the like to open the door of the box and steal the goods.

An unmanned vehicle, also called as a wheeled mobile robot, mainly relies on an intelligent driving system in the vehicle to realize unmanned driving. When an unmanned vehicle performs delivery, there is a great security threat because the unmanned vehicle performs delivery autonomously on planned routes or algorithms carried by the unmanned vehicle. In addition, the inventor of the present disclosure has also found that: when the unmanned vehicle is used for delivering goods, since the position of the unmanned vehicle is not fixed and the moving range of the unmanned vehicle is wide, the safety threat during delivery is further increased.

Therefore, the inventor proposes a delivery method, a delivery device and a delivery system for a delivery scene of an unmanned vehicle so as to improve the safety in the delivery process of the unmanned vehicle.

FIG. 1 is an exemplary flow diagram of a delivery method according to some embodiments of the present disclosure. As shown in FIG. 1, the delivery method of this embodiment includes steps S102 to S108.

In step S102, a state of an unmanned vehicle is monitored.

The unmanned vehicle could transmit its current state. During monitoring, for example, a request could be transmitted to the unmanned vehicle at a preset period to make the unmanned vehicle return its own state, or the unmanned vehicle could autonomously report a request at a preset period, or other aperiodic monitoring methods may be adopted, which will not be described in detail herein.

In the solution of the present disclosure, the state of the unmanned vehicle may be divided into two main categories, which comprise a normal working state and an abnormal working state.

An abnormal working state refers to a state in which manual intervention of the operation of the unmanned vehicle may occur, and may comprise one or more of the following states, for example: a duration when the unmanned vehicle is disconnected from the server exceeds a preset duration, the unmanned vehicle is being manually controlled, the unmanned vehicle is malfunctioning, the unmanned vehicle is under maintenance, or the unmanned vehicle is being charged. Other states may also be set as abnormal working states as required, which will not be described herein in detail.

For example, when a duration of the disconnection between the unmanned vehicle and the server exceeds a preset duration, a situation may occur in which the communication process of the unmanned vehicle is manually intervened, for example, a network intruder attempts to disconnect the unmanned vehicle from the server to modify the transmission parameters of the unmanned vehicle; or someone attempts to disconnect the unmanned vehicle from the server to cause physical damage to the unmanned vehicle, etc.

A normal working state could be, for example, a state in which the performance of the unmanned vehicle is normal and the delivery work is being performed according to a preset route. If necessary, other states may be set as normal working states, for example, after the abnormal working state is determined, the states not in the abnormal working state are all determined as normal working states.

In step S104, a verification code transmitted from the unmanned vehicle is received, wherein the verification code is input into the unmanned vehicle by a user.

In some embodiments, the user could enter the verification code via a verification code input interface on the unmanned vehicle, such as a touch screen, a keyboard, a bar code scanner such as a two-dimensional code scanner, a camera, a microphone, and the like.

In step S106, the verification code is verified in response to the unmanned vehicle being in a normal working state.

If the unmanned vehicle is in a normal working state, that is, the unmanned vehicle is not in an abnormal working state, it means that the current environment of the unmanned vehicle is safe, and therefore a normal verification process could be executed.

The verification code could be generated in advance for the order to be delivered by the unmanned vehicle, for example, a string of characters could be selected to generate the verification code, and transmitted to the user by means of a short message, an application message, a telephone, or an email, etc. After obtaining the verification code, the user could input the verification code through input equipment such as a keyboard or a touch screen of the unmanned vehicle, and the unmanned vehicle transmits the verification code input by the user to a verification device such as a server for verification.

In step S108, in response to successful verification, an unpacking instruction is transmitted to the unmanned vehicle. After receiving the unpacking instruction transmitted from the server, the unmanned vehicle could open a container.

The unpacking instruction could, for example, directly comprise an identifier of the container in the unmanned vehicle and an unpacking order, and could also comprise other information. The unmanned vehicle could identify the container to be unpacked after performing decoding, converting or other processing on other information.

The method of the above-described embodiment could be executed by a server for example, or another device such as a computer or a processor, as required. Furthermore, the method of this embodiment may further optionally comprise step S103.

In step S103, a prompt or alarm message is transmitted in response to the unmanned vehicle being in an abnormal working state.

For example, if the unmanned vehicle loses connection with the server or encounters an error, an alarm message may be transmitted to a corresponding management device or staff; if the unmanned vehicle is in states such as charging or maintenance, a prompt message could be transmitted so that relevant staff could focus on it.

Other types of information could also be transmitted, or no information may be transmitted, as desired, by those skilled in the art when the unmanned vehicle is working abnormally. No matter which specific operation described above is performed, when the unmanned vehicle is working abnormally, no unpacking instruction is transmitted to the unmanned vehicle, namely no feedback is offered for the verification code used for unpacking which is input by the user.

When the unmanned vehicle is in an abnormal working state, any one of the following processing methods could be adopted: instructing the unmanned vehicle not to transmit the verification code input by the user, not to receive the verification code input by the user and transmitted from the unmanned vehicle, to receive the verification code input by the user but not to perform verification, or to verify the verification code input by the user but not to transmit the unpacking instruction. No matter which processing method is adopted, the unpacking instruction would not be transmitted to the unmanned vehicle finally.

By adopting the methods of the above embodiment, the verification code input by the user and transmitted from the unmanned vehicle could be verified when the unmanned vehicle is not in an abnormal working state, and the unpacking instruction is transmitted to the unmanned vehicle when the verification is successful. Therefore, the situation of manual intervention and illegal stealing of goods could be avoided when the unmanned vehicle is in an abnormal working state, and the delivery safety of the unmanned vehicle is improved.

When the verification code input by the user is verified, the verification code input by the user could be directly compared with a verification code stored in the server, and the verification is passed if the verification codes are consistent. In addition, the verification method shown in FIG. 2A could also be used.

Figure 2A:
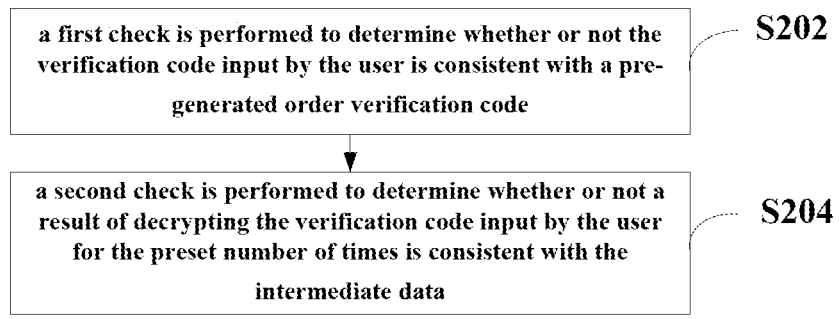
FIG. 2A is an exemplary flow diagram of a verification method according to some embodiments of the present disclosure.

FIG. 2A is an exemplary flow diagram of a verification method according to some embodiments of the present disclosure. As shown in FIG. 2A, the delivery method of this embodiment comprises steps S202 to S204.

In step S202, a first check is performed to determine whether or not the verification code input by the user is consistent with a pre-generated order verification code, wherein, the order verification code is generated by encrypting the intermediate data for a preset number of times.

That is, the first check is passed when the verification code input by the user is consistent with the pre-generated order verification code.

If the first check is passed, the second check could be performed; if not, the verification is unsuccessful.

In step S204, a second check is performed to determine whether or not a result of decrypting the verification code input by the user for the preset number of times is consistent with the intermediate data.

That is, the second check is passed when the result of decrypting the verification code input by the user is consistent with intermediate data.

If both the first check and the second check are passed, the verification is successful.

The intermediate data is data associated with the order, and may be order information, an order number, or a randomly generated string, etc. The intermediate data is encrypted to generate an order verification code.

Multiple verification could be performed according to the verification code input by the user by the method of the above embodiment, thus safety is improved.

In the above embodiment, the intermediate data could optionally comprise one or more kinds of data. When the intermediate data comprises plurality kinds of data, and the plurality kinds of data may be sequentially verified.

In some embodiments, the intermediate data comprises a primary code corresponding to a pre-generated order verification code, and encrypted data obtained by symmetrically encrypting the primary code. The symmetric encryption method may comprise at least one of Advanced Encryption Standard (AES) algorithm, Data Encryption Standard (DES) algorithm, International Data Encryption Algorithm (IDEA), or Digital Signature Algorithm. An embodiment of the second check is described below with reference to FIG. 2B.

Figure 2B:
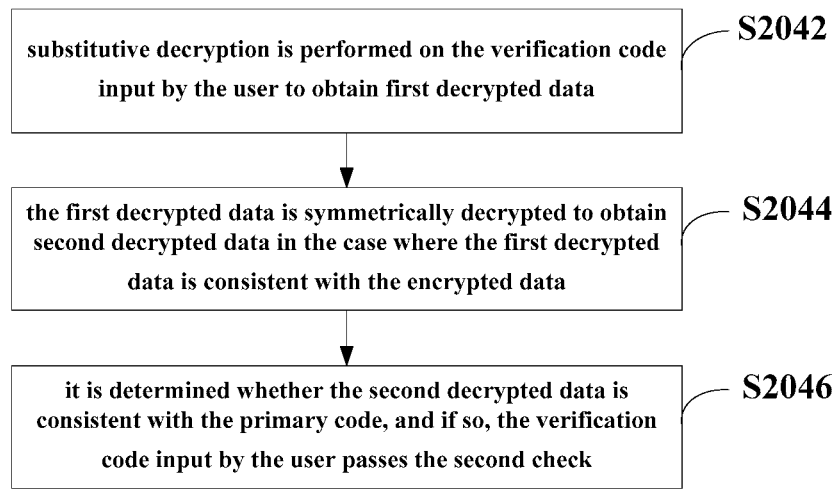
FIG. 2B is an exemplary flow diagram of a second check method according to some embodiments of the present disclosure.

FIG. 2B is an exemplary flow diagram of a second check method according to some embodiments of the present disclosure. As shown in FIG. 2B, the second check method of this embodiment comprises steps S2042 to S2046.

In step S2042, substitutive decryption is performed on the verification code input by the user to obtain first decrypted data.

In step S2044, the first decrypted data is symmetrically decrypted to obtain second decrypted data in the case where the first decrypted data is consistent with the encrypted data.

In step S2046, it is determined whether the second decrypted data is consistent with the primary code, and if so, the verification code input by the user passes the second check.

Accordingly, encryption and substitutive encryption corresponding to the adopted decryption method may also be adopted when generating an order verification code. An embodiment of the order verification code generation method of the present disclosure is described below with reference to FIG. 3A.

Figure 3A:
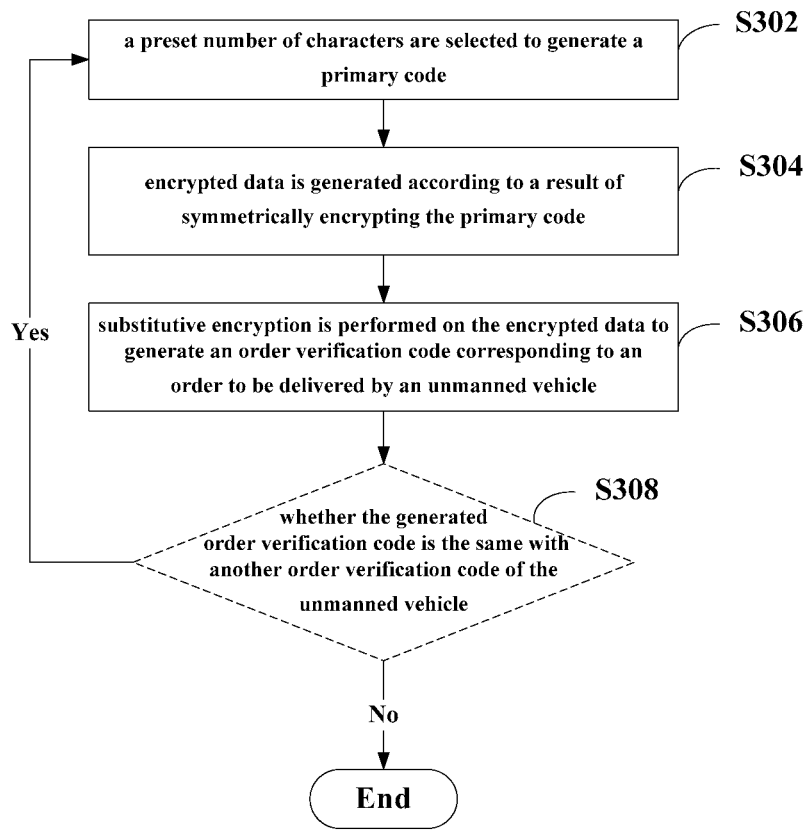
FIG. 3A is an exemplary flow diagram of an order verification code generation method according to some embodiments of the present disclosure.

FIG. 3A is a flow diagram of some embodiments of an order verification code generation method of the present disclosure. As shown in FIG. 3A, the order verification code generation method of this embodiment comprises steps S302 to S306.

In step S302, a preset number of characters are selected to generate a primary code.

In some embodiments, a preset number of characters may be selected to generate the primary code from a preset primary code range, which comprises one or more of letters, numbers, or graphical symbols. Thus, the cracking difficulty could be improved.

In step S304, encrypted data is generated according to a result of symmetrically encrypting the primary code.

In some embodiments, encrypted data may be generated according to a result of performing AES (Advanced Encryption Standard) encryption on the primary code.

AES encryption is a block encryption method which has the advantages of strong security, high performance, high efficiency, easy use, flexibility and the like. AES encryption could be directly performed on the primary code to generate encrypted data. In addition, data generated by performing AES encryption on the primary code may be converted, and the converted data may be used as encrypted data.

In some embodiments, encrypted data may be generated specifically in the following manner: firstly, performing AES encryption on the primary code to obtain binary data; then, the binary data is converted into hexadecimal data to generate encrypted data. Therefore, the complexity of generating an order verification code could be improved, and the cracking difficulty could be improved.

In step S306, substitutive encryption is performed on the encrypted data to generate an order verification code corresponding to an order to be delivered by an unmanned vehicle.

Substitutive encryption is a method of encrypting data on a regular basis. So that the security of encryption can be further enhanced.

Further, the method of this embodiment may further optionally comprise step S308.

In step S308, it is determined whether or not the order verification code generated in step S306 is the same with another order verification code of the unmanned vehicle. If so, the method returns to the step S302, and the order verification code is re-generated for the order to be delivered by the unmanned vehicle; if not, the order verification code generated in step S306 is used as an order verification code corresponding to the order to be delivered by the unmanned vehicle.

Therefore, each order of the same unmanned vehicle could have a unique order verification code.

The method of this embodiment may not comprise step S308. If there are more than two same order verification codes stored in the same unmanned vehicle, the user who performs verification could be identified during verification, for example, the user information or order information is also received while a verification code input by the user is received, so as to ensure that the order verification code of the order corresponding to the user is verified.

After the method of the above embodiment is performed, a corresponding relation among the unmanned vehicle information, the order information, the primary code, the encrypted data, and the verification code may be stored. When the verification code input by the user needs to be verified, a first check and a second check could be performed according to the corresponding relation. An embodiment of an order verification code processing method of the present disclosure is described below with reference to FIG. 3B.

Figure 3B:
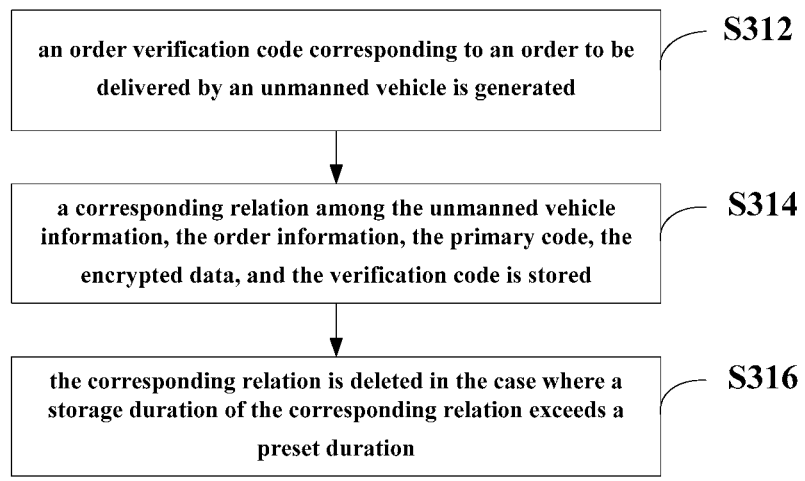
FIG. 3B is an exemplary flow diagram of an order verification code processing method according to some embodiments of the present disclosure.

FIG. 3B is an exemplary flow diagram of an order verification code processing method according to some embodiments of the present disclosure. As shown in FIG. 3B, the order verification code processing method of this embodiment comprises steps S312 to S316.

In step S312, an order verification code corresponding to an order to be delivered by an unmanned vehicle is generated.

The order verification code may be generated by the method shown in FIG. 3A, or by other generation methods, which are not described in detail herein.

In step S314, a corresponding relation among the unmanned vehicle information, the order information, the primary code, the encrypted data, and the verification code is stored.

In step S316, the corresponding relation is deleted in the case where a storage duration of the corresponding relation exceeds a preset duration.

For example, the corresponding relation may be stored in a cache and periodically cleared. Thus, the verification code can be made time-efficient. When the time of storage of the corresponding relation exceeds the preset time, even if the user inputs a correct verification code, the verification code input by the user would not pass the verification because the corresponding relation is deleted. Therefore, the safety of delivery is improved.

After the verification code is generated, the pre-generated order verification code could be transmitted to the corresponding user corresponding to the order to be delivered by the unmanned vehicle. An embodiment of a verification code transmission method of the present disclosure is described below with reference to FIG. 4.

Figure 4:
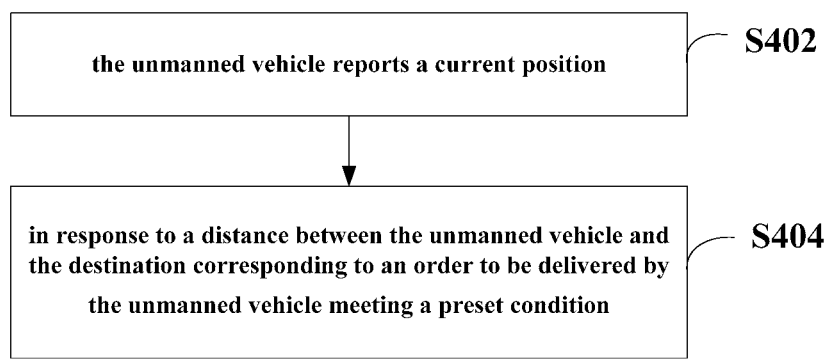
FIG. 4 is an exemplary flow diagram of a verification code transmission method according to some embodiments of the present disclosure.

FIG. 4 is an exemplary flow diagram of a verification code transmission method according to some embodiments of the present disclosure. As shown in FIG. 4, the verification code transmission method of this embodiment comprises steps S402 to S404.

In step S402, the unmanned vehicle reports a current position. For example, the unmanned vehicle may report a current location to a server.

In step S404, in response to a distance between the unmanned vehicle and the destination corresponding to an order to be delivered by the unmanned vehicle meeting a preset condition, for example, the distance is less than a preset value, the order verification code is transmitted to a user corresponding to the order to be delivered by the unmanned vehicle. For example, the user could be notified to pick up the goods and the order verification code could be transmitted to the user when the unmanned vehicle is approaching the destination of the delivery. Therefore, the time between the transmission of the order verification code and the pickup of the goods by the user is reduced as much as possible, and the safety of delivery is improved.

In addition, a verification code could be generated and transmitted to the user corresponding to the order to be delivered by the unmanned vehicle in response to the distance between the unmanned vehicle and the destination corresponding to the order to be delivered by the unmanned vehicle meeting a preset condition. By adopting this method, the time between the generation of the order verification code and the pickup of the goods by the user could be reduced as much as possible, and the probability that someone tries to randomly input a verification code to open the container could be reduced. Therefore, the safety of the system is improved.

An embodiment of a delivery system of the present disclosure is described below with reference to FIG. 5.

Figure 5:
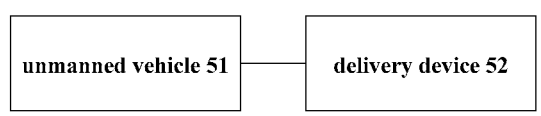
FIG. 5 is an exemplary block diagram of a delivery system according to some embodiments of the present disclosure.

FIG. 5 is an exemplary block diagram of a delivery system according to some embodiments of the present disclosure. As shown in FIG. 5, the delivery system of this embodiment comprises an unmanned vehicle 51 and a delivery device 52. The delivery device 51 may be a device for performing any of the delivery methods described above and may also be implemented in the manner described with reference to FIG. 6 and FIG. 7.

Some embodiments of the present disclosure may also provide another delivery system comprising a device for performing any one of the delivery methods described above.

An embodiment of the delivery device of the present disclosure is described below with reference to FIG. 6.

Figure 6:
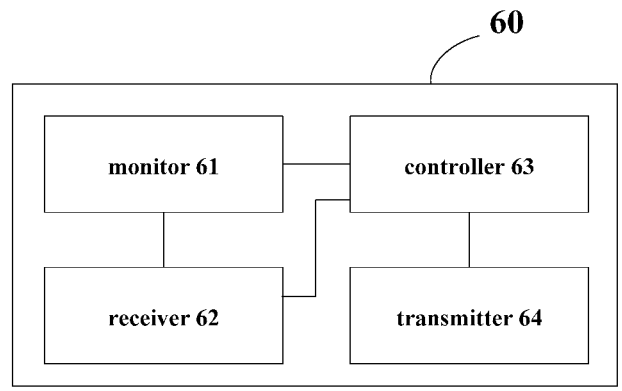
FIG. 6 is an exemplary block diagram of a delivery device according to some embodiments of the present disclosure.

FIG. 6 is an exemplary block diagram of a delivery device according to some embodiments of the present disclosure. As shown in FIG. 6, the delivery device 60 of this embodiment comprises: a monitor 61 configured to monitor a state of an unmanned vehicle; a receiver 62 configured to receive a verification code, which is input into the unmanned vehicle by a user and transmitted from the unmanned vehicle; a controller 63 configured to perform verification to the verification code in response to the unmanned vehicle being in a normal working state; and a transmitter 64 configured to transmit an unpacking instruction to the unmanned vehicle in response to successful verification.

In some embodiments, the verification code is input by the user via a verification code input interface on the unmanned vehicle.

In some embodiments, an abnormal working state comprises one or more of the following states: a duration when the unmanned vehicle is disconnected from the server exceeds a preset duration, the unmanned vehicle is being manually controlled, the unmanned vehicle is malfunctioning, the unmanned vehicle is under maintenance, or the unmanned vehicle is being charged.

In some embodiments, the controller is further configured to not transmit an unpacking instruction to the unmanned vehicle in response to the unmanned vehicle being in an abnormal working state.

An embodiment of a delivery device 70 of the present disclosure is described below with reference to FIG. 7.

Figure 7:
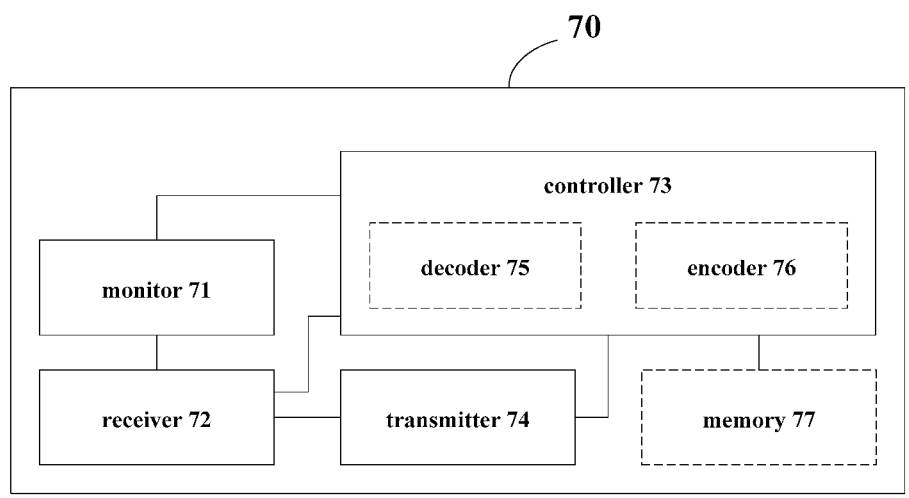
FIG. 7 is an exemplary block diagram of a delivery device according to some other embodiments of the present disclosure.

FIG. 7 is an exemplary block diagram of a delivery device according to some other embodiments of the present disclosure. As shown in FIG. 7, the delivery device 70 of this embodiment comprises a monitor 71, a receiver 72, a controller 73, and a transmitter 74. In addition, the delivery device 70 may further comprise: a decoder 75 configured to decrypt a verification code input by the user.

At this time, the verification performed by the controller 73 may comprise, for example: a first check for determining whether or not the verification code input by the user is consistent with a pre-generated order verification code, wherein, the order verification code is generated by encrypting the intermediate data for a preset number of times; a second check for determining whether a result of decrypting the verification code input by the user for the preset number of times is consistent with intermediate data.

In some embodiments, the intermediate data may comprise a primitive code, and encrypted data is obtained by symmetrically encrypting the primitive code. At this time, the decoder 75 may also be configured to: perform substitutive decryption on the verification code input by the user to obtain first decrypted data; and symmetrically decrypt the first decrypted data to obtain second decrypted data; the second check comprises: obtaining first decrypted data from the decoder; obtaining second decrypted data from the decoder in the case where the first decrypted data is consistent with the encrypted data; determining that the verification code input by the user passes the second check in the case where the second decrypted data is consistent with the primitive code.

In addition, the delivery device 70 may further comprise an encoder 76 configured to generate an order validation code by: selecting a preset number of characters to generate a primitive code, wherein the characters comprise one or more of letters, numbers or graphic symbols; generating encrypted data according to a result of symmetrically encrypting the primitive code; performing substitutive encryption on the encrypted data to generate an order verification code corresponding to an order to be delivered by the unmanned vehicle.

In some embodiments, the encoder 76 may also be configured to re-generate the order verification code for the order to be delivered by the unmanned vehicle in the case where the generated order verification code is the same with another order verification code of the unmanned vehicle.

In some embodiments, the encoder 76 may further be configured to select a preset number of characters to generate the primary code from a preset primary code range, comprising one or more of letters, numbers, or graphical symbols.

In some embodiments, the encoder 76 may be further configured to symmetrically encrypt the primary code, e.g., perform AES encryption to obtain binary data; and the binary data is converted into hexadecimal data to generate encrypted data.

In addition, the delivery device 70 may also comprise a memory 77 configured to store a corresponding relation among unmanned vehicle information, order information, the primitive code, the encrypted data and the order verification code, wherein the corresponding relation is deleted in the case where a storage duration of the corresponding relation exceeds a preset duration.

In addition, the controller 73 is further configured to transmit a pre-generated order verification code to a corresponding user corresponding to the order to be delivered by the unmanned vehicle via the transmitter 74.

In some embodiments, the transmitter 74 may be further configured to transmit a pre-generated order verification code to a user corresponding to an order to be delivered by the unmanned vehicle in response to a distance between the unmanned vehicle and a destination corresponding to the order to be delivered by the unmanned vehicle meeting a preset condition.

Some other implementations of the delivery device are described below. In some embodiments, the delivery device comprises: a monitoring module configured to monitor a state of the unmanned vehicle; a receiving module configured to receive a verification code, which is input into the unmanned vehicle by a user and transmitted from the unmanned vehicle; a verification module configured to perform verification to the verification code in response to the unmanned vehicle being in a normal working state; and an instruction transmission module configured to transmit an unpacking instruction to the unmanned vehicle in response to successful verification.

In some embodiments, the verification code is input by the user via a verification code input interface on the unmanned vehicle.

In some embodiments, the verification comprises: a first check for determining whether or not the verification code input by the user is consistent with a pre-generated order verification code, wherein, the order verification code is generated by encrypting the intermediate data for a preset number of times; a second check for determining whether a result of decrypting the verification code input by the user for the preset number of times is consistent with intermediate data.

In some embodiments, the intermediate data comprises a primitive code, and encrypted data is obtained by symmetrically encrypting the primitive code; the verification module is further configured to: perform substitutive decryption on the verification code input by the user to obtain first decrypted data; and symmetrically decrypt the first decrypted data to obtain second decrypted data; the second check comprises: obtaining first decrypted data from the verification module; obtaining second decrypted data from the verification module in the case where the first decrypted data is consistent with the encrypted data; determining that the verification code input by the user passes the second check in the case where the second decrypted data is consistent with the primitive code.

In some embodiments, the delivery device further comprises a verification code generation module configured to select a preset number of characters to generate a primary code, wherein, the characters comprise one or more of letters, numbers or graphic symbols; to generate encrypted data according to a result of performing AES encryption on the primary code; and to perform substitutive encryption on the encrypted data to generate an order verification code corresponding to an order to be delivered by the unmanned vehicle.

In some embodiments, the delivery device further comprises a verification code storage module configured to store a corresponding relation among unmanned vehicle information, order information, the primitive code, the encrypted data and the order verification code, wherein the corresponding relation is deleted in the case where a storage duration of the corresponding relation exceeds a preset duration.

In some embodiments, the delivery device further comprises a verification code transmitting module configured to transmit a pre-generated order verification code to a user corresponding to an order to be delivered by the unmanned vehicle in response to a distance between the unmanned vehicle and a destination corresponding to the order to be delivered by the unmanned vehicle meeting a preset condition.

An embodiment of an unmanned vehicle of the present disclosure is described below with reference to FIG. 8.

Figure 8:
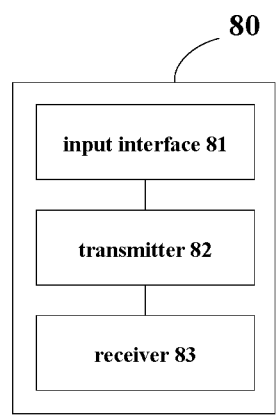
FIG. 8 is an exemplary block diagram of an unmanned vehicle according to some embodiments of the present disclosure.

FIG. 8 is an exemplary block diagram of an unmanned vehicle according to some embodiments of the present disclosure. As shown in FIG. 8, the unmanned vehicle 80 of this embodiment comprises: an input interface 81 configured to receive a verification code input by a user; a transmitter 82 configured to transmit a current state to a delivery device and transmit the verification code input by the user to the delivery device, so that the delivery device performs verification to the verification code in response to the unmanned vehicle being in a normal working state; and a receiver 83 configured to receive an unpacking instruction transmitting from the delivery device in response to successful verification.

In some embodiments, the transmitter 82 may be further configured to report a current position to the delivery device, so that the delivery device transmits a pre-generated order verification code to a user corresponding to an order to be delivered by the unmanned vehicle in response to a distance between the unmanned vehicle and a destination corresponding to the order to be delivered by the unmanned vehicle meeting a preset condition.

Figure 9:
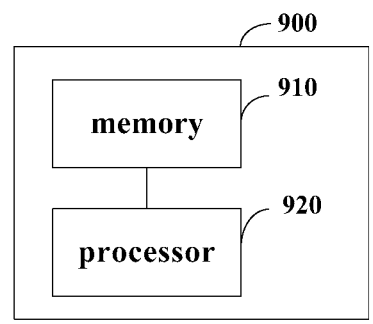
FIG. 9 is an exemplary block diagram of a delivery device according to still some other embodiments of the present disclosure.

FIG. 9 is an exemplary block diagram of a delivery device according to still some other embodiments of the present disclosure. As shown in FIG. 9, device 900 of this embodiment comprises: a memory 910 and a processor 920 coupled to the memory 910, the processor 920 being configured to perform the delivery method of any of the embodiments described above based on instructions stored in the memory 910.

Memory 910 may comprise, for example, a system memory, fixed non-volatile storage media, and the like. The system memory stores, for example, an operating system, an application program, a Boot Loader, and other programs.

Figure 10:
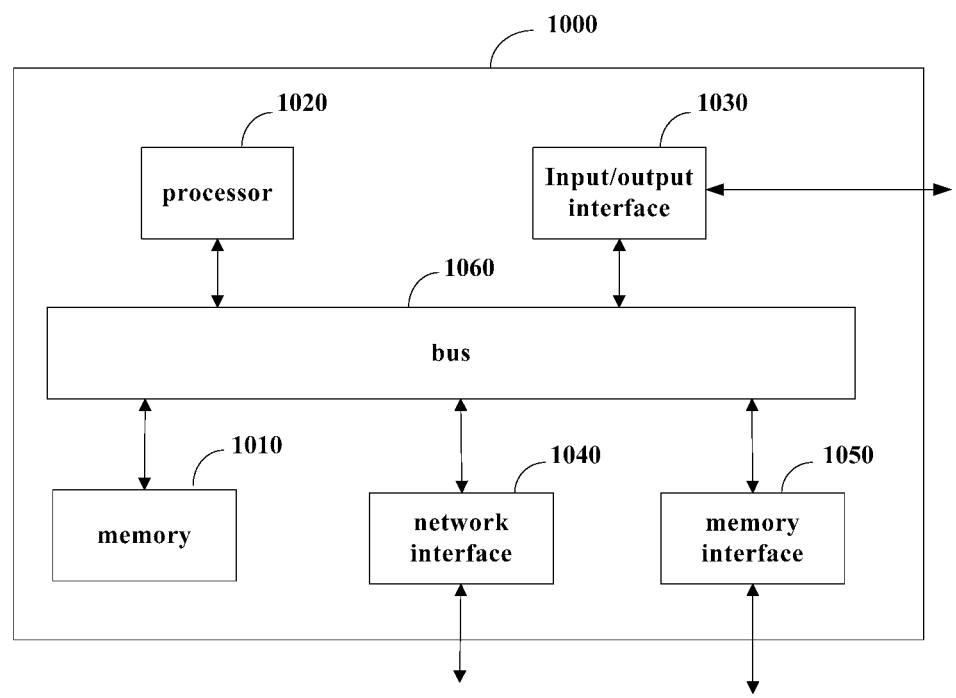
FIG. 10 is an exemplary block diagram of a delivery device according to still some other embodiments of the present disclosure.

FIG. 10 is an exemplary block diagram of a delivery device according to still some other embodiments of the present disclosure. As shown in FIG. 10, device 1000 of this embodiment comprises memory 1010 and processor 1020, and may also comprise input/output interface 1030, network interface 1040, storage interface 1050, and so forth. These interfaces 1030, 1040, 1050 and the memory 1010 and the processor 1020 may be connected by a bus 1060, for example. The input/output interface 1030 provides a connection interface for input/output devices such as a display, a mouse, a keyboard, and a touch screen. The network interface 1040 provides a connection interface for various networking devices. The storage interface 1050 provides a connection interface for an external storage device such as an SD card and a U disk.

The embodiments of the present disclosure also provide a computer-readable storage medium having stored thereon a computer program, wherein the program, when executed by a processor, implements any one of the foregoing delivery methods.

It shall be understood by those skilled in the art that the embodiments of the present disclosure may be provided as a method, a system, or a computer program product. Therefore, examples of the present disclosure can take the form of an entirely hardware example, an entirely software example or an example containing both hardware and software elements. Moreover, the present disclosure may take the form of a computer program product embodied on one or more computer-usable non-transitory storage media (including but not limited to disks, CD-ROM, optical storage, etc.) having computer-usable program code embodied in the medium.

The present disclosure is described with reference to the flow diagrams and/or block diagrams of the method, device (system) and computer program product according to the embodiments of the present disclosure. It shall be understood that each flow and/or block in the flow diagrams and/or block diagrams and a combination thereof may be implemented by computer program instructions. These computer program instructions may be provided to the processor of a general purpose computer, a dedicated computer, an embedded processing device or any other programmable data processing device to produce a machine causing the instructions executed by the processor of the computer or the other programmable data processing device to produce means for implementing the functions designated in the one or more flows in the flow charts and/or one or more blocks in the block diagrams.

These computer program instructions may be stored in a computer readable memory that can direct a computer or any other programmable data processing device to operate in a specific manner, such that the instructions stored in the computer readable memory produce a manufactured article including instruction means that implements the functions designated in one or more flows in the flow charts and/or one or more blocks in the block diagrams.

These computer program instructions may also be loaded on a computer or any other programmable data processing device causing the computer or the other programmable data processing device to perform a series of operation steps to produce a computer-implemented process, such that the instructions executed on the computer or the other programmable device provide steps for implementing the functions designated in the one or more flows in the flowcharts and/or one or more blocks in the block diagrams.

The above contents are only preferred embodiments of the present disclosure, but are not used to limit the present disclosure. Any modification, equivalent replacement, improvement and etc. within spirit and principles of the present disclosure shall be contained in the protection scope of the present disclosure.

What is claimed is:

1. A delivery method, comprising:
monitoring a state of an unmanned vehicle, states of the unmanned vehicle including a normal working state and an abnormal working state, the normal working state being a working state other than the abnormal working state, and the abnormal working state including at least one of a duration when the unmanned vehicle is disconnected from a server exceeding a preset duration, the unmanned vehicle being manually controlled, the unmanned vehicle malfunctioning, the unmanned vehicle being under maintenance, and the unmanned vehicle being charged;
receiving a verification code, which is input into the unmanned vehicle by a user and transmitted from the unmanned vehicle;
performing a verification to the verification code in response to the unmanned vehicle being in the normal working state; and
transmitting an unpacking instruction to the unmanned vehicle in response to successful verification,
wherein no unpacking instruction is transmitted to the unmanned vehicle and no feedback is offered for the verification code input by the user in response to the unmanned vehicle being in the abnormal working state.

2. The delivery method of claim 1, wherein the verification code is input by the user via a verification code input interface on the unmanned vehicle.

3. The delivery method of claim 1, wherein the verification comprises:
   a first check for determining whether or not the verification code input by the user is consistent with a pre-generated order verification code, the pre-generated order verification code being generated by encrypting intermediate data for a preset number of times; and
   a second check for determining whether a result of decrypting the verification code input by the user for the preset number of times is consistent with the intermediate data.

4. The delivery method of claim 3, wherein
   the intermediate data comprises a primitive code,
   encrypted data is obtained by symmetrically encrypting the primitive code; and
   the second check comprises:
      performing substitutive decryption on the verification code input by the user to obtain first decrypted data;
      symmetrically decrypting the first decrypted data to obtain second decrypted data in the case where the first decrypted data is consistent with the encrypted data; and
      determining that the verification code input by the user passes the second check in the case where the second decrypted data is consistent with the primitive code.

5. The delivery method of claim 3, wherein the pre-generated order verification code is generated by:
   selecting a preset number of characters to generate a primitive code, the characters including one or more of letters, numbers, and graphic symbols;
   generating encrypted data according to a result of symmetrically encrypting the primitive code; and
   performing substitutive encryption on the encrypted data to generate the pre-generated order verification code corresponding to an order to be delivered by the unmanned vehicle.

6. The delivery method of claim 5, wherein the pre-generated order verification code is re-generated for the order to be delivered by the unmanned vehicle in the case where the pre-generated order verification code is the same with another order verification code of the unmanned vehicle.

7. The delivery method of claim 5, further comprising:
   storing a corresponding relation among unmanned vehicle information, order information, the primitive code, the encrypted data, and the pre-generated order verification code;
   deleting the corresponding relation in the case where a storage duration of the corresponding relation exceeds a preset duration.

8. The delivery method of claim 1, wherein a pre-generated order verification code is transmitted to a user corresponding to an order to be delivered by the unmanned vehicle in response to a distance between the unmanned vehicle and a destination corresponding to the order to be delivered by the unmanned vehicle meeting a preset condition.

9. A non-transitory computer readable storage medium storing a computer program that, when executed by a processor, implements the delivery method of claim 1.

10. A delivery device, comprising:
    a memory; and
    a processor coupled to the memory, wherein the processor is configured to execute instructions for performing a delivery method comprising:
       monitoring a state of an unmanned vehicle, states of the unmanned vehicle including a normal working state and an abnormal working state, the normal working state being a working state other than the abnormal working state, and the abnormal working state including at least one of a duration when the unmanned vehicle is disconnected from a server exceeding a preset duration, the unmanned vehicle being manually controlled, the unmanned vehicle malfunctioning, the unmanned vehicle being under maintenance, and the unmanned vehicle being charged;
       receiving a verification code, which is input into the unmanned vehicle by a user and transmitted from the unmanned vehicle;
       performing a verification to the verification code in response to the unmanned vehicle being in the normal working state; and
       transmitting an unpacking instruction to the unmanned vehicle in response to successful verification,
       wherein no unpacking instruction is transmitted to the unmanned vehicle and no feedback is offered for the verification code input by the user in response to the unmanned vehicle being in the abnormal working state.

11. The delivery device according to claim 10, wherein the verification code is input by the user via a verification code input interface on the unmanned vehicle.

12. The delivery device according to claim 10, wherein the verification comprises:
    a first check for determining whether or not the verification code input by the user is consistent with a pre-generated order verification code, the pre-generated order verification code being generated by encrypting intermediate data for a preset number of times; and
    a second check for determining whether a result of decrypting the verification code input by the user for the preset number of times is consistent with the intermediate data.

13. The delivery device according to claim 12, wherein
    the intermediate data comprises a primitive code,
    encrypted data is obtained by symmetrically encrypting the primitive code; and
    the second check comprises:
       performing substitutive decryption on the verification code input by the user to obtain first decrypted data;
       symmetrically decrypting the first decrypted data to obtain second decrypted data in the case where the first decrypted data is consistent with the encrypted data; and
       determining that the verification code input by the user passes the second check in the case where the second decrypted data is consistent with the primitive code.

14. The delivery device according to claim 12, wherein the pre-generated order verification code is generated by:
    selecting a preset number of characters to generate a primitive code, the characters including one or more of letters, numbers, and graphic symbols;
    generating encrypted data according to a result of symmetrically encrypting the primitive code; and
    performing substitutive encryption on the encrypted data to generate the pre-generated order verification code corresponding to an order to be delivered by the unmanned vehicle.

15. The delivery device according to claim 14, wherein the pre-generated order verification code is re-generated for the order to be delivered by the unmanned vehicle in the case where the pre-generated order verification code is the same with another order verification code of the unmanned vehicle.

16. The delivery device according to claim 14, wherein the instructions further comprise:
 storing a corresponding relation among unmanned vehicle information, order information, the primitive code, the encrypted data, and the pre-generated order verification code; and
 deleting the corresponding relation in the case where a storage duration of the corresponding relation exceeds a preset duration.

17. The delivery device according to claim 10, wherein a pre-generated order verification code is transmitted to a user corresponding to an order to be delivered by the unmanned vehicle in response to a distance between the unmanned vehicle and a destination corresponding to the order to be delivered by the unmanned vehicle meeting a preset condition.

18. An unmanned vehicle, comprising:
 a memory; and
 a processor coupled to the memory, wherein the processor is configured to execute instructions for perform a delivery method comprising:
  transmitting a current state to a delivery device, states of the unmanned vehicle including a normal working state and an abnormal working state, the normal working state being a working state other than the abnormal working state, and the abnormal working state including at least one of a duration when the unmanned vehicle is disconnected from a server exceeding a preset duration, the unmanned vehicle being manually controlled, the unmanned vehicle malfunctioning, the unmanned vehicle being under maintenance, and the unmanned vehicle being charged;
  receiving a verification code input by a user;
  transmitting the verification code to the delivery device, so that the delivery device performs verification to the verification code in response to the unmanned vehicle being in a normal working state; and
  receiving an unpacking instruction transmitting from the delivery device in response to successful verification,
 wherein no unpacking instruction is transmitted to the unmanned vehicle and no feedback is offered for the verification code input by the user in response to the unmanned vehicle being in the abnormal working state.

19. The unmanned vehicle according to claim 18, wherein the instructions further comprise:
 reporting a current position to the delivery device, so that the delivery device transmits a pre-generated order verification code to a user corresponding to an order to be delivered by the unmanned vehicle in response to a distance between the unmanned vehicle and a destination corresponding to the order to be delivered by the unmanned vehicle meeting a preset condition.

* * * * *